(12) United States Patent
Sun

(10) Patent No.: US 12,284,258 B2
(45) Date of Patent: Apr. 22, 2025

(54) INFORMATION TRANSMISSION METHOD, SYSTEM, AND APPARATUS

(71) Applicants: Beijing Wodong Tianjun Information Technology Co., Ltd., Beijing (CN); Beijing Jingdong Century Trading Co., Ltd., Beijing (CN)

(72) Inventor: Guodong Sun, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 24 days.

(21) Appl. No.: 18/037,981

(22) PCT Filed: Oct. 29, 2021

(86) PCT No.: PCT/CN2021/127536
§ 371 (c)(1),
(2) Date: May 19, 2023

(87) PCT Pub. No.: WO2022/105574
PCT Pub. Date: May 27, 2022

(65) Prior Publication Data
US 2023/0412704 A1    Dec. 21, 2023

(30) Foreign Application Priority Data
Nov. 20, 2020  (CN) .................... 202011306158.3

(51) Int. Cl.
H04L 67/60    (2022.01)
H04L 69/22    (2022.01)

(52) U.S. Cl.
CPC .............. *H04L 67/60* (2022.05); *H04L 69/22* (2013.01)

(58) Field of Classification Search
CPC ......... H04L 67/60; H04L 69/22; H04L 67/06; G06F 16/24539; G06F 16/9574
See application file for complete search history.

(56) References Cited

U.S. PATENT DOCUMENTS 9,106,607 B1    8/2015  Lepeska et al.
10,061,852 B1 *  8/2018  Plenderleith .......... H04L 67/568
(Continued)

FOREIGN PATENT DOCUMENTS

| CN | 101808117 A | 8/2010 |
|----|-------------|--------|
| CN | 102117309 A | 7/2011 |
| CN | 106294365 A | 1/2017 |
| CN | 106775637 A | 5/2017 |

(Continued)

*Primary Examiner* — Michael A Keller
*Assistant Examiner* — Thao D Duong
(74) *Attorney, Agent, or Firm* — Venable LLP; Henry J. Daley

(57) ABSTRACT

An information transmission method, system and apparatus are provided. The method comprises: in response to reception of a data request sent by a client, parsing content of the data request to obtain identification information corresponding to the data request; in response to the identification information being null, obtaining a first data set corresponding to the data request; dividing all pieces of data in the first data set on the basis of data resources of the pieces of data and data time lengths of the pieces of data to obtain a second data set corresponding to the first data set, the division indicating performing division of data request order on all the pieces of data in the first data set on the basis of the data time lengths; and sending the second data set to the client.

18 Claims, 4 Drawing Sheets

(56) References Cited

U.S. PATENT DOCUMENTS

| | | | |
|---|---|---|---|
| 2004/0059719 | A1 | 3/2004 | Gupta et al. |
| 2006/0212524 | A1* | 9/2006 | Wu .................. H04L 67/1095 709/206 |
| 2007/0250552 | A1* | 10/2007 | Lango .................. G06F 3/0643 |
| 2010/0208293 | A1 | 8/2010 | Takeuchi |
| 2013/0145428 | A1* | 6/2013 | Holmes .................. G06F 21/44 726/4 |
| 2017/0006128 | A1 | 1/2017 | Graham-Cumming et al. |
| 2018/0246966 | A1 | 8/2018 | Liu et al. |
| 2019/0138739 | A1 | 5/2019 | Hu et al. |
| 2019/0149819 | A1* | 5/2019 | Phillips .................. H04N 19/80 375/240.02 |
| 2020/0267203 | A1 | 8/2020 | Jindal et al. |
| 2021/0385514 | A1* | 12/2021 | Da Silva Pratas Gabriel ............ H04N 21/234345 |

FOREIGN PATENT DOCUMENTS

| | | |
|---|---|---|
| CN | 107231398 A | 10/2017 |
| CN | 107479887 A | 12/2017 |
| CN | 107729139 A | 2/2018 |
| CN | 107888690 A | 4/2018 |
| CN | 108156252 A | 6/2018 |
| CN | 108990092 A | 12/2018 |
| CN | 109684079 A | 4/2019 |
| CN | 109739749 A | 5/2019 |
| CN | 109902241 A | 6/2019 |
| CN | 109936605 A | 6/2019 |
| CN | 110321178 A | 10/2019 |
| CN | 111078735 A | 11/2019 |
| CN | 111638922 A | 9/2020 |
| CN | 111752960 A | 10/2020 |
| CN | 111858276 A | 10/2020 |
| CN | 113765979 A | 12/2021 |
| JP | 2012160086 A | 8/2012 |

* cited by examiner

100

```
┌─────────────────────────────────────────────────────────────┐
│ parsing, in response to receiving a data request sent by a  │
│ client, content of the data request to obtain identification│──── 101
│ information corresponding to the data request               │
└─────────────────────────────────────────────────────────────┘
                            │
┌─────────────────────────────────────────────────────────────┐
│ acquiring, in response to the identification information    │──── 102
│ being null, a first data set corresponding to the data request│
└─────────────────────────────────────────────────────────────┘
                            │
┌─────────────────────────────────────────────────────────────┐
│ grouping all pieces of data in the first data set, based on │
│ the data resources of the pieces of data and the data time  │──── 103
│ lengths of the pieces of data, to obtain a second data set  │
│ corresponding to the first data set                         │
└─────────────────────────────────────────────────────────────┘
                            │
┌─────────────────────────────────────────────────────────────┐
│            sending the second data set to the client        │──── 104
└─────────────────────────────────────────────────────────────┘
```

Fig. 1

INFORMATION TRANSMISSION METHOD, SYSTEM, AND APPARATUS

CROSS-REFERENCE TO RELATED APPLICATIONS

This patent application is a national stage of International Application No. PCT/CN2021/127536, filed on Oct. 29, 2021, which claims the priority of the Chinese Patent Application filed on Nov. 20, 2020 with the application number 202011306158.3 and the invention titled "INFORMATION TRANSMISSION METHOD, SYSTEM, AND APPARATUS". Both of the aforementioned applications are hereby incorporated by reference in their entireties.

TECHNICAL FIELD

Embodiments of the present disclosure relate to the field of computer technology, in particular to the field of big data technology, and more particularly, to a method, system and apparatus for transmitting information.

BACKGROUND

On important pages of many applications, such as the home page, since it is necessary to display various kinds of information, a server needs to integrate all kinds of data from various databases or upstream interfaces, and then return the data together to a client for display. For an application page, a time period from a time point at which an interface request is sent to a time point at which the page is displayed to a user is mainly grouped into two parts, one is interface request time period and the other is data parsing and page rendering time period. Throughout the process, various types of data need to be collected from different places, and if one piece of data is very time-consuming to acquire, the time consumed on the entire interface will be lengthened. Due to a large amount of data, when the data is transmitted from the server to the client, data transmission time is often lengthened. Especially in the case of poor networking, data latency is more serious. Further, the client has to parse and render complex pages after getting the data, which also increases the time length of page display. As a result, a combination of various factors may cause a display time to be too long for important complex pages. Besides, it is a serial process from data query to data transmission then to page rendering, which further prolongs the time length from data request to page display, greatly affecting user experience.

SUMMARY

The present disclosure provides a method, system and apparatus for transmitting information, a device, and a storage medium.

Some embodiments of the present disclosure provide a method for transmitting information, the method including: parsing, in response to receiving a data request sent by a client, content of the data request to obtain identification information corresponding to the data request, the identification information being grouping information comprised in the data request sent by a client; acquiring, in response to the identification information being null, a first data set corresponding to the data request, the first data set comprising: data sources of pieces of data required by the data request and data time lengths of the pieces of data corresponding to the data sources, a data source being used to represent path information for acquiring corresponding data, and a data time length being used to represent a length of time consumed to acquire corresponding data from a data source of the corresponding data; grouping all pieces of data in the first data set, based on the data resources of the pieces of data and the data time lengths of the pieces of data, to obtain a second data set corresponding to the first data set, the grouping indicating performing grouping on all the pieces of data in the first data set based on the data time lengths to obtain the grouping information the data request, the second data set comprising: pieces of the identification information and a data set corresponding to each piece of the identification information, and the data set comprising: the data sources of pieces of data corresponding to each piece of identification information, the data time lengths of the pieces of data corresponding to each piece of identification information and data contents of the pieces of data corresponding to each piece of identification information; and sending the second data set to the client.

In some embodiments, grouping all pieces of data in the first data set, based on the data resources of the pieces of data and the data time lengths of the pieces of data, to obtain a second data set corresponding to the first data set, comprises: re-arranging all the pieces of data in the first data set, based on the data resources of the pieces of data, to obtain the re-arranged first data set; and grouping the re-arranged first data set, based on a comparison result of a data resource of each piece of data with a time consumption threshold and a time consumption gradient, to obtain the second data set corresponding to the re-arranged first data set, wherein the grouping is used to represent performing grouping on pieces of data in which each piece of data has a data time length greater than the time consumption threshold according to the time consumption gradient, and the time consumption threshold and the time consumption gradient are set based on an importance of each piece of data in the first data set.

In some embodiments, after grouping all pieces of data in the first data set, based on the data resources of the pieces of data and the data time lengths of the pieces of data, to obtain a second data set corresponding to the first data set, the method further comprises: adjusting data time lengths of pieces of data in the second data set based on an adjustment method, to obtain the adjusted second data set, wherein the adjustment method is used to represent a weighting operation performed on the data time lengths of the pieces of data in the second data set based on a preset time period.

In some embodiments, before grouping all pieces of data in the first data set, based on the data resources of the pieces of data and the data time lengths of the pieces of data, to obtain a second data set corresponding to the first data set, the method further comprises: correcting the data time lengths of the pieces of data in the first data set, based on a determination result of an importance of each piece of data in the first data set, wherein the correction is performed to reduce a time length consumed by a piece of data of a high importance.

In some embodiments, the method further comprises: acquiring, in response to the identification information not being null, a first data set corresponding to the data request and sending the first data set to the client.

According to a second aspect of the present disclosure, a method for transmitting information is provided, the method including: acquiring, in response to receiving a query request from a user, query information corresponding to the query request; determining, based on the query information and a first list, whether the query is a first-time query, wherein the first list is used to store data information corresponding to the query request; sending, in response to the query being the first-time query, a data request corresponding to the query information to the server; and updating, in response to receiving the second data sent by the server, the first list based on the identification information in the second data set and a data set corresponding to each piece of the identification information.

In some embodiments, the method further includes: acquiring, in response to the query not being a first-time query, a set of identification information corresponding to the query information in the first list; and sending the data request corresponding to the identification information to the server in sequence, based on each piece of identification information in the set of identification information.

In some embodiments, the method further includes: converting, in response to receiving a first data set sent by the server, the first data set to obtain converted data information, wherein the converting is used to represent rendering pieces of data in the first data set based on a page rendering method and/or stacking the pieces of data in the first data set based on a data time length; and displaying a page corresponding to the converted data information to the user.

Some embodiments of the present disclosure provide a system for transmitting information: the system comprising: a server and a client, where, the server is configured to perform the method for transmitting information according to any embodiment of the first aspect, and the client is configured to perform the method for transmitting information according to any embodiment of the second aspect.

In some embodiments, the grouping unit comprises: a re-arranging module, configured to re-arrange all the pieces of data in the first data set, based on the data resources of the pieces of data, to obtain the re-arranged first data set; and a grouping module, configured to group the re-arranged first data set, based on a comparison result of a data resource of each piece of data with a time consumption threshold and a time consumption gradient, to obtain the second data set corresponding to the re-arranged first data set, wherein the grouping is used to represent performing grouping on pieces of data in which each piece of data has a data time length greater than the time consumption threshold according to the time consumption gradient, and the time consumption threshold and the time consumption gradient are set based on an importance of each piece of data in the first data set.

In some embodiments, the apparatus further comprises: an adjustment unit, configured to adjust data time lengths of pieces of data in the second data set based on an adjustment method, to obtain the adjusted second data set, wherein the adjustment method is used to represent a weighting operation performed on the data time lengths of the pieces of data in the second data set based on a preset time period.

In some embodiments, the apparatus further comprises: a correction unit, configured to correct the data time lengths of the pieces of data in the first data set, based on a determination result of an importance of each piece of data in the first data set, wherein the correction is performed to reduce a time length consumed by a piece of data of a high importance.

In some embodiments, the acquisition unit is further configured to acquire, in response to the identification information not being null, a first data set corresponding to the data request; and the sending unit is further configured to send the first data set to the client.

Some embodiments of the present disclosure provide an apparatus for transmitting information, the apparatus comprising: an information acquiring unit, configured to acquire, in response to receiving a query request from a user, query information corresponding to the query request; a first determining unit, configured to determine, based on the query information and a first list, whether the query is a first-time query, wherein the first list is used to store data information corresponding to the query request; a request sending unit, configured to send, in response to the query being the first-time query, a data request corresponding to the query information to the server; and an updating unit, configured to update, in response to receiving the second data sent by the server, the first list based on the identification information in the second data set and a data set corresponding to each piece of the identification information.

In some embodiments, the apparatus further comprises: a second determining unit, configured to acquire, in response to the query not being a first-time query, a set of identification information corresponding to the query information in the first list; and sending the data request corresponding to the identification information to the server in sequence, based on each piece of identification information in the set of identification information.

In some embodiments, the apparatus further comprises: a data set conversion unit, configured to convert, in response to receiving a first data set sent by the server, the first data set to obtain converted data information, wherein the converting is used to represent rendering pieces of data in the first data set based on a page rendering method and/or stacking the pieces of data in the first data set based on a data time length; and display a page corresponding to the converted data information to the user.

Some embodiments of the present disclosure provide an electronic device, including: at least one processor; and a memory communicatively connected to the at least one processor; where, the memory stores instructions executable by the at least one processor, and the instructions, when executed by the at least one processor, cause the at least one processor to perform the method as described in any one of the implementations in the first aspect or the second aspect.

Some embodiments of the present disclosure provide a non-transitory computer readable storage medium storing computer instructions, where, the computer instructions are used to cause the computer to perform the method as described in any one of the implementations in the first aspect or the second aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for a better understanding of the present solution and do not constitute a limitation to the present disclosure.

FIG. 1 is a schematic diagram of a first embodiment of a method for transmitting information according to the present disclosure;

DETAILED DESCRIPTION OF EMBODIMENTS

Figure 2:
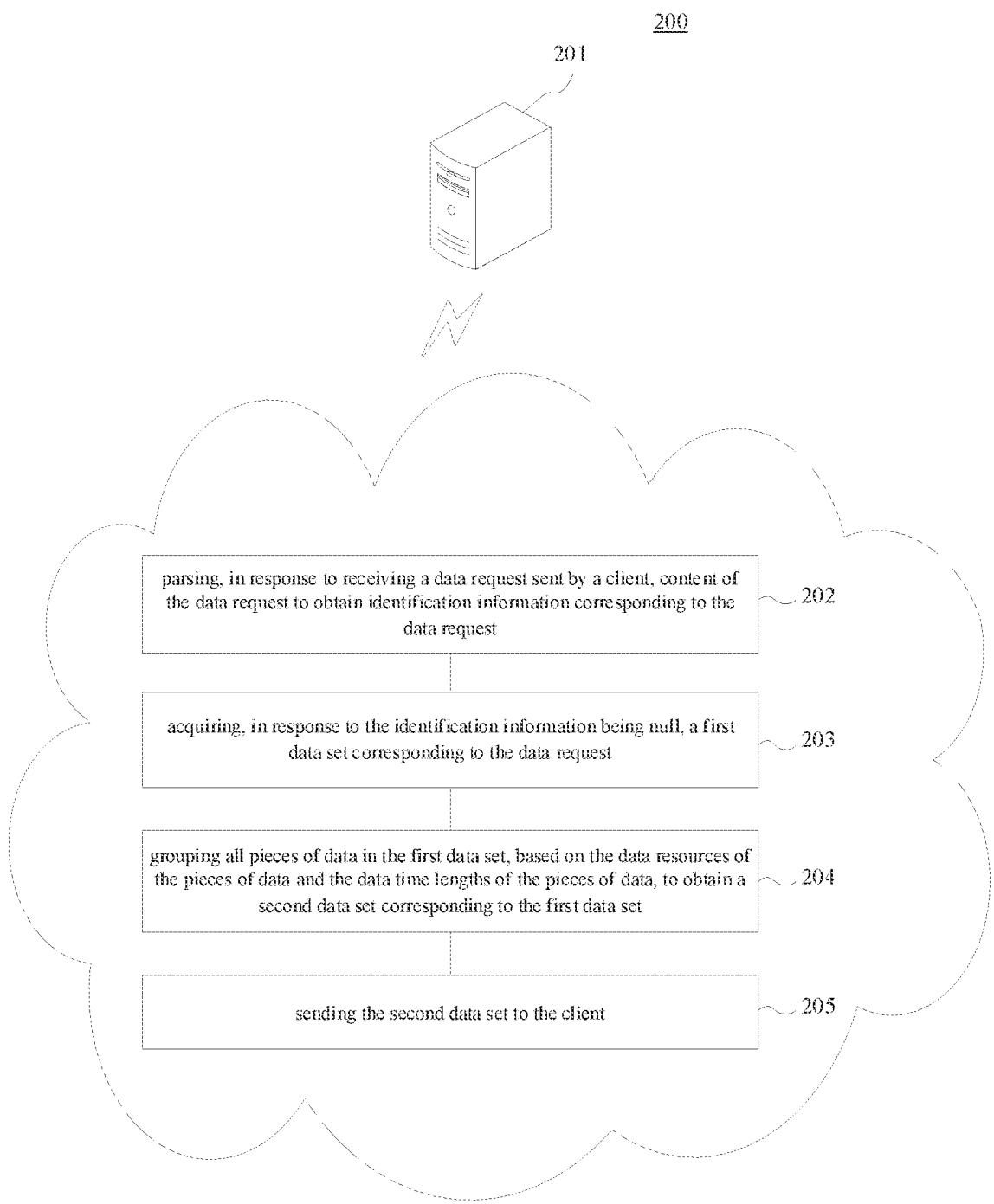
FIG. 2 is a scenario diagram of the method for transmitting information that can implement embodiments of the present disclosure.

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

It should be noted that, embodiments in the present disclosure and features in the embodiments may be combined with each other on a non-conflict basis. The present disclosure will be described in detail below with reference to the accompanying drawings and in conjunction with the embodiments.

FIG. 1 shows a schematic diagram 100 of a first embodiment of a method for transmitting information according to the present disclosure. The method for transmitting information includes the following steps 101 to 104.

Step 101, parsing, in response to receiving a data request sent by a client, content of the data request to obtain identification information corresponding to the data request.

In the present embodiment, an executing body (such as a service platform) may receive the data request sent by the client through a wired connection or wireless connection. After reception, the executing body may parse the content of the data request to obtain the identification information corresponding to the data request. The identification information is grouping information comprised in the data request, such as 1, 2, 3. The data request may be a data request for displaying data on a certain page in an application, and the data request includes the identification information. It should be noted that the wireless connection may include, but is not limited to, 3G, 4G, 5G connections, WiFi connection, Bluetooth connection, WiMAX connection, Zigbee connection, UWB (ultra wideband) connection, and other wireless connections known now or developed in the future.

Step 102, acquiring, in response to the identification information being null, a first data set corresponding to the data request.

In the present embodiment, the executing body may perform determination on the identification information obtained in step 101, and if the identification information is determined to be null, acquire the first data set corresponding to the data request locally or from a remote end. The first data set includes: data sources of pieces of data required by the data request and data time lengths of the pieces of data corresponding to the data sources. The first data set may further include: data contents of the pieces of data corresponding to the data sources and the data time lengths. The data source is used to represent path information for acquiring the data, such as database 1, database 2, interface 1, interface 2. The data time length is used to represent a length of time consumed to acquire the data from the data source, such as 50 ms.

Step 103, grouping all pieces of data in the first data set, based on the data resources of the pieces of data and the data time lengths of the pieces of data, to obtain a second data set corresponding to the first data set.

In the present embodiment, the executing body may group all the pieces of data in the first data set using a grouping method, based on the data resources of the pieces of data and the data time lengths of the pieces of data, to obtain the second data set corresponding to the first data set. The grouping may indicate performing grouping on all the pieces of data in the first data set based on the data time lengths to obtain the grouping information the data request. The grouping method may be preset based on the data sources and the data time lengths, e.g., data with shorter data time lengths (faster acquisition) is grouped into group 1 and data with longer data time lengths (slower acquisition) is grouped into group 2. The second data set includes: pieces of identification information and a data set corresponding to each piece of identification information. A piece of identification information is a group number that is included in the data request sent by the client. A data set includes: data sources of pieces of data corresponding to each piece of identification information, data time lengths of the pieces of data corresponding to each piece of identification information and data contents of the pieces of data corresponding to each piece of identification information.

In some alternative implementations of the present embodiment, the grouping all pieces of data in the first data set, based on the data resources of the pieces of data and the data time lengths of the pieces of data, to obtain a second data set corresponding to the first data set, includes: performing re-arranging on all the pieces of data in the first data set, based on the data resources of the pieces of data, to obtain the sorted first data set; and grouping the re-arranged first data set, based on each comparison result of a data resource of each piece of data with a time consumption threshold and a time consumption gradient, to obtain the second data set corresponding to the re-arranged first data set, where the grouping is used to represent performing grouping on pieces of data in which each piece of data has a data time length greater than the time consumption threshold according to the time consumption gradient, and the time consumption threshold and the time consumption gradient are set based on importance of the data in the first data set. The time consumption threshold is used to determine whether the request needs to be split, and the time consumption gradient is used to represent an increment in time length during splitting. For example, if a maximum value of the data time lengths of all the pieces of data is greater than the time consumption threshold, it is determined that splitting is required, then the pieces of data that need to be split are split based on the time consumption gradient. The data content of each piece of data in the second data set includes complete information of a date level to which the piece of data belong. For example, a piece data productName may be saved under a data level "product", and then a field name of the piece of data is product.productName. The time consumption threshold and the time consumption gradient may be set based on the data levels and may be dynamically adjusted. A more flexible, intelligent and refined grouping in requesting data is realized, which improves an efficiency of information transmission.

As an example, the time consumption threshold may be set based on a mean of time consumptions in respective data levels plus double standard deviations, enabling to perform request splitting on data transmission in a certain interface that requires longer time consumption. The time consumption gradient may be obtained by first calculating a difference between the most time-consuming interface in a certain level and the time consumption threshold, then dividing this difference by 2. For example, if the data time lengths of the pieces of data are 20 ms, 30 ms, 50 ms, 120 ms and 150 ms, the time consumption threshold is 100 ms and the time consumption gradient is 60 ms, the data may be grouped into two groups, i.e., 20 ms, 30 ms, 50 ms for one group and 120 ms, 150 ms for another group. The above divisor "2" determines the number of groups, the number of groups here should not be too many. If too many, interface accesses may increase.

In some alternative implementations of the present embodiment, after the grouping all pieces of data in the first data set, based on the data resources of the pieces of data and the data time lengths of the pieces of data, to obtain a second data set corresponding to the first data set, the method further includes: adjusting the data time lengths of pieces of data in the second data set based on an adjustment method, to obtain the adjusted second data set, where the adjustment method is used to represent a weighting operation performed on the data time lengths of the pieces of data in the second data set based on a preset time period. Due to changes in an upstream interface or changes in database data, time consumption for data acquisition may not be a fixed time, and may cause an increase, or decrease in the time consumption, or fluctuate around an intermediate value. In order to adapt to the changes in the time consumption for data acquisition, by dynamically adjusting to reduce the impact of an occasional too long or too short data time consumption, a performance loss of frequent server calculations is reduced, to accommodate changes in the acquisition time of a certain piece of data, or changes in the time consumption for data acquisition due to interface changes.

In some alternative implementations of the present embodiment, before the grouping all pieces of data in the first data set, based on the data resources of the pieces of data and the data time lengths of the pieces of data, to obtain a second data set corresponding to the first data set, the method further includes: correcting the data time lengths of the pieces of data in the first data set, based on a determination result of an importance of each piece of data in the first data set, where the correction is aimed at reducing the time length of a piece of data of a high importance. In order to allow users to see the data of a high importance as early as possible, such as titles and prices of goods, the data time lengths of this part of data are corrected to reduce the time consumption for acquiring this part of data, to ensure that the data is grouped into the less time-consuming group, so that the client can quickly obtain this part of the data and display the same to the users.

Step 104, sending the second data set to the client.

In the present embodiment, the executing body may send the second data set obtained in step 103 to the client.

With further reference to FIG. 2, the method 200 for transmitting information in the present embodiment runs on a service platform 201. When the service platform 201 receives a data request sent by a client, it parses content of the data request to obtain identification information 202 corresponding to the data request; if the service platform 201 determines that the identification information is null, it acquires a first data set 203 corresponding to the data request; then the service platform 201 groups all pieces of data in the first data set based on data sources of the pieces of data and data time lengths of the pieces of data, to obtain a second data set 204 corresponding to the first data set; and finally the service platform 201 sends the second data set obtained by the grouping to the client 205. Here, the grouping may be performed, based on the data time lengths, on all the pieces of data in the first data set to obtain the group information the data request.

In the method for transmitting information provided by the above embodiment of the present disclosure, in response to receiving a data request sent by a client, content of the data request is parsed, to obtain identification information corresponding to the data request, where the identification information being grouping information comprised in the data request sent by the client; in response to the identification information being null, a first data set corresponding to the data request is acquired; all pieces of data in the first data set are grouped, based on data resources of the pieces of data and data time lengths of the pieces of data, to obtain a second data set corresponding to the first data set, where, the grouping indicating performing grouping on all the pieces of data in the first data set based on the data time lengths to obtain the grouping information the data request; and the second data set is sent to the client, which solves the following problems in the existing technology: in displaying a complex page, data transmission in an interface can only be split according to subjective assessment of a developer, and a splitting effect is not good; and if the time for acquiring time-consuming data later has been optimized to a reasonable value, it is inconvenient to recover the data transmission in the interface that has been split. By automatically splitting an one-time interface request into multiple times of interface requests, and requesting different data based on different identification information obtained after the splitting, the time-consuming data and non-time-consuming data may be acquired separately, the non-time-consuming data is processed first after it is returned, so that a serial process from data query to data transmission to page rendering becomes a partially serial, partially parallel process, which improves an efficiency of information transmission, and finally enables users to view page content as soon as possible, improving user experience.

Figure 3:
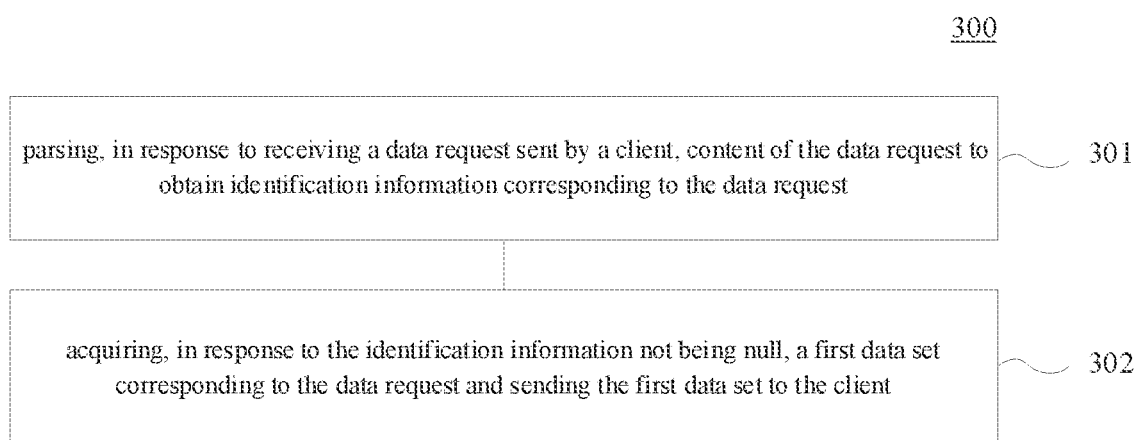
FIG. 3 is a schematic diagram of a second embodiment of a method for transmitting information according to the present disclosure.

With further reference to FIG. 3, illustrating a schematic diagram 300 of a second embodiment of a method for transmitting information. A flow of the method includes the following steps 301 to 302.

Step 301, parsing, in response to receiving a data request sent by a client, content of the data request to obtain identification information corresponding to the data request.

Step 302, acquiring, in response to the identification information not being null, a first data set corresponding to the data request and sending the first data set to the client.

In the present embodiment, if the executing body determines that the identification information is not null, it acquires the first data set corresponding to the data request and sends the first data set to the client. The data request corresponds to the identification information, that is, if the identification information is 1, the data request is the first data request that needs to be sent after the grouping based on the data time lengths. The first data set includes: data sources of pieces of data required by the data request, data time lengths of the pieces of data corresponding to the data sources and data contents of the pieces of data corresponding to the data time lengths.

In the present embodiment, the specific operation of step 301 is basically the same as the operation of step 101 in the embodiment shown in FIG. 1, detailed description thereof will be omitted herein.

As can be seen from FIG. 3, compared with the embodiment corresponding to FIG. 1, the schematic diagram 300 of the method for transmitting information in the present embodiment, in response to receiving a data request sent by a client, parses content of the data request to obtain identification information corresponding to the data request, in response to the identification information not being null, acquires a first data set corresponding to the data request and sends the first data set to the client. According to the identification information, data acquired faster is returned first, and data acquired slower is returned later in sequence, so that a serial process from data query to data transmission then to page rendering becomes a partially serial, partially parallel process, which improves the efficiency of information transmission, and finally enables users to view page content as soon as possible, improving user experience.

Figure 4:
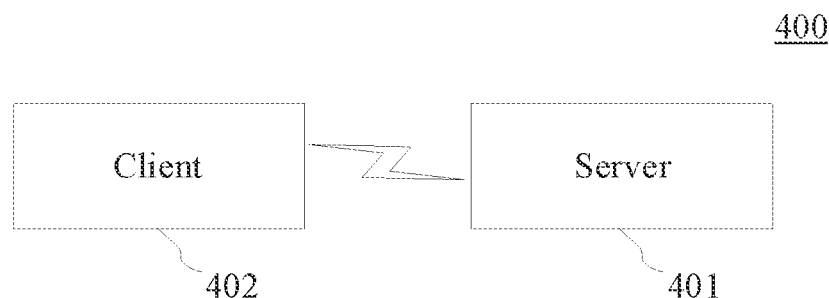
FIG. 4 is a schematic structural diagram of an embodiment of a system for transmitting information according to the present disclosure.

With further reference to FIG. 4, the present disclosure provides a system for transmitting information, as shown in FIG. 4, the system includes: a server 401 and a client 402, where the server is configured to perform the above method for transmitting information. The client is configured to acquire, in response to receiving a query request from a user, query information corresponding to the query request; determine, based on the query information and a first list, whether the query is a first-time query, where the first list is used to store data information corresponding to the query request; send, in response to the query being the first-time query, a data request corresponding to the query information to the server; and update, in response to receiving the second data sent by the server, the first list based on identification information in the second data set and the data sets corresponding to the pieces of the identification information.

In the system, the client is further configured to acquire, in response to the query not being a first-time query, a set of identification information corresponding to the query information in the first list; and send the data request corresponding to the identification information to the server in sequence, based on each piece of the identification information in the set of identification information.

In the system, the client is further configured to convert, in response to receiving the first data sent by the server, the first data set to obtain converted data information, where the conversion is used to represent rendering the pieces of data in the first data set based on a page rendering method and/or stacking the pieces of data in the first data set based on the data time lengths; and display a page corresponding to the converted data information to the user.

The system realizes a flexible and intelligent system for transmitting information. By automatically splitting data transmission at an one-time interface request into multiple times of data transmission, and requesting different data based on different identification information after the splitting, the time-consuming data and non-time-consuming data may be acquired separately, the non-time-consuming data is processed first after it is returned, so that a serial process from data query to data transmission to page rendering becomes a partially serial, partially parallel process, which improves an efficiency of information transmission, and finally enables users to view page content as soon as possible, improving user experience.

Figure 5:
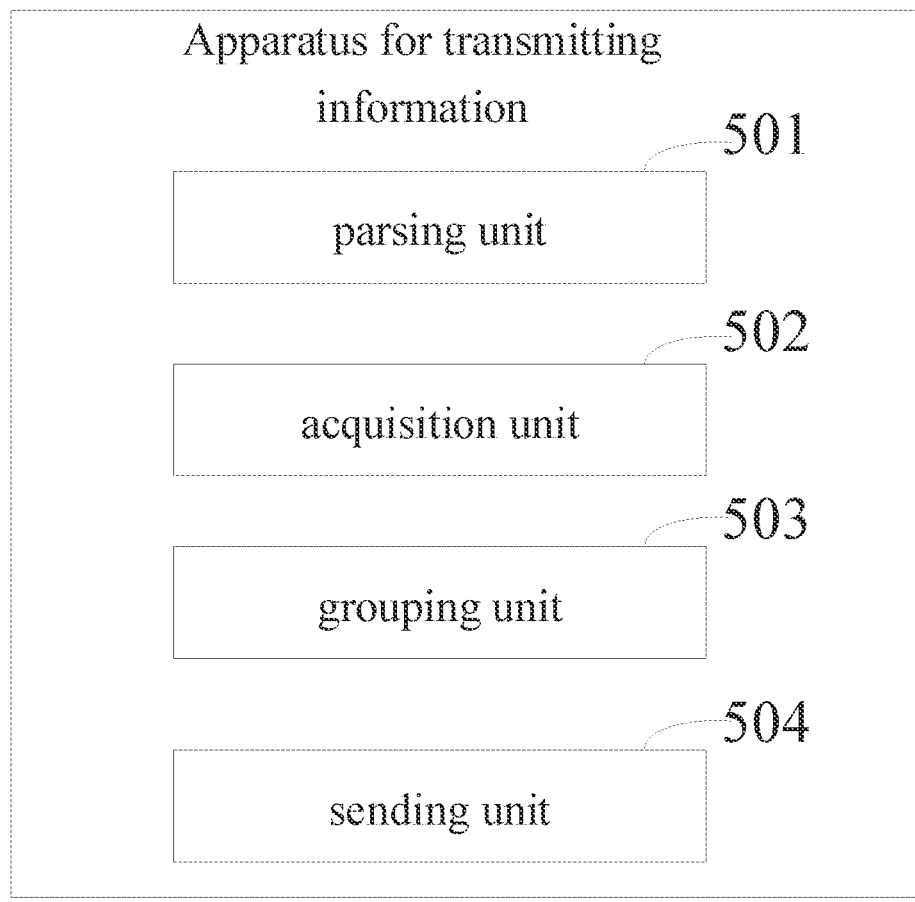
FIG. 5 is a schematic structural diagram of an embodiment of an apparatus for transmitting information according to the present disclosure.

With further reference to FIG. 5, as an implementation of the method shown in the FIGS. 1-3, the present disclosure provides an embodiment of an apparatus for transmitting information. The embodiment of the apparatus corresponds to the embodiment of the method shown in FIG. 1. The apparatus may be applied to various electronic devices.

As shown in FIG. 5, the apparatus 500 for transmitting information in the present embodiment includes: a parsing unit 501, an acquisition unit 502, a grouping unit 503 and a sending unit 504. The parsing unit is configured to parse, in response to receiving a data request sent by a client, content of the data request to obtain identification information corresponding to the data request, the identification information being grouping information comprised in the data request sent by a client. The acquisition unit is configured to acquire, in response to the identification information being null, a first data set corresponding to the data request, the first data set comprising: data sources of pieces of data required by the data request and data time lengths of the pieces of data corresponding to the data sources, a data source being used to represent path information for acquiring corresponding data, and a data time length being used to represent a length of time consumed to acquire corresponding data from a data source of the corresponding data. The grouping unit is configured to group all pieces of data in the first data set, based on the data resources of the pieces of data and the data time lengths of the pieces of data, to obtain a second data set corresponding to the first data set, the grouping indicating performing grouping on all the pieces of data in the first data set based on the data time lengths to obtain the grouping information the data request, the second data set comprising: pieces of the identification information and a data set corresponding to each piece of the identification information, and the data set comprising: the data sources of pieces of data corresponding to each piece of identification information, the data time lengths of the pieces of data corresponding to each piece of identification information and data contents of the pieces of data corresponding to each piece of identification information. The sending unit is configured to send the second data set to the client.

In the present embodiment, in the apparatus 500 for transmitting information, for the specific processing and the technical effects of the parsing unit 501, the acquisition unit 502, the grouping unit 503 and the sending unit 504, reference may be made to step 101 to step 104 in the corresponding embodiment of FIG. 1 respectively, detailed description thereof will be omitted herein.

In some alternative implementations of the present embodiment, the grouping unit includes: a re-arranging module, configured to re-arrange all the pieces of data in the first data set, based on the data resources of the pieces of data, to obtain the re-arranged first data set; and a grouping module, configured to group the re-arranged first data set, based on a comparison result of a data resource of each piece of data with a time consumption threshold and a time consumption gradient, to obtain the second data set corresponding to the re-arranged first data set, wherein the grouping is used to represent performing grouping on pieces of data in which each piece of data has a data time length greater than the time consumption threshold according to the time consumption gradient, and the time consumption threshold and the time consumption gradient are set based on an importance of each piece of data in the first data set.

In some alternative implementations of the present embodiment, the apparatus further includes: an adjustment unit, configured to adjust data time lengths of pieces of data in the second data set based on an adjustment method, to obtain the adjusted second data set, wherein the adjustment method is used to represent a weighting operation performed on the data time lengths of the pieces of data in the second data set based on a preset time period.

In some alternative implementations of the present embodiment, the apparatus further includes: a correction unit, configured to correct the data time lengths of the pieces of data in the first data set, based on a determination result of an importance of each piece of data in the first data set, wherein the correction is performed to reduce a time length consumed by a piece of data of a high importance.

In some alternative implementations of the present embodiment, the acquisition unit is further configured to acquire, in response to the identification information not being null, a first data set corresponding to the data request; and the sending unit is further configured to send the first data set to the client.

According to an embodiment of the present disclosure the present disclosure further provides an electronic device and a readable storage medium.

Figure 6:
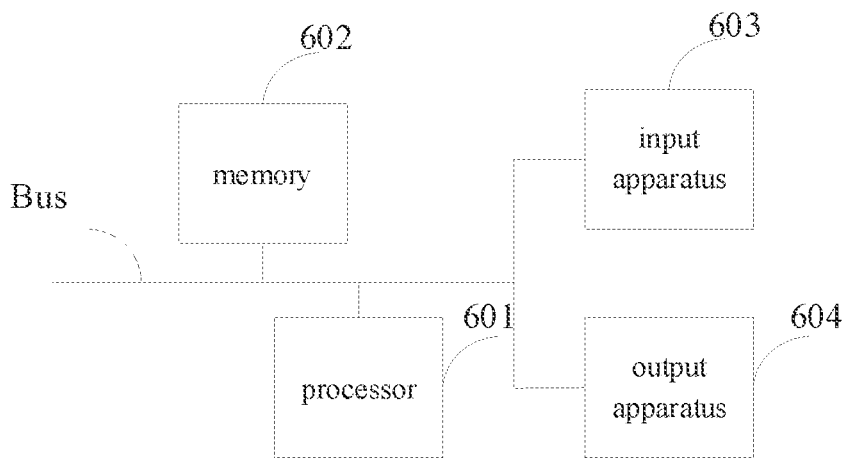
FIG. 6 is a block diagram of an electronic device of the method for transmitting information for implementing embodiments of the present disclosure.

As shown in FIG. 6, is a block diagram of an electronic device of the method for transmitting information according to embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 6, one processor 601 is used as an example.

The memory 602 is a non-transitory computer readable storage medium provided by the present disclosure. The memory stores instructions executable by at least one processor, so that the at least one processor performs the method for transmitting information provided by the present disclosure. The non-transitory computer readable storage medium of the present disclosure stores computer instructions for causing the computer to perform the method for transmitting information provided by the present disclosure.

The memory 602, as a non-transitory computer readable storage medium, may be used to store non-transitory software programs, non-transitory computer executable programs and modules, such as program instructions/modules corresponding to the method for transmitting information in embodiments of the present disclosure (for example, the parsing unit 501, the acquisition unit 502, the grouping unit 503 and the sending unit 504 as shown in FIG. 5). The processor 601 executes the non-transitory software programs, instructions, and modules stored in the memory 602 to execute various functional applications and data processing of the server, that is, to implement the method for transmitting information in the foregoing method embodiments.

The memory 602 may include a storage program area and a storage data area, where the storage program area may store an operating system and at least one function required application program; and the storage data area may store data created by the use of the electronic device for transmitting information. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device for transmitting information through a network. Examples of the above network include but are not limited to the Internet, intranet, local area network, mobile communication network, and combinations thereof.

The electronic device of the method for transmitting information may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input numeric or character information, and generate key signal input related to user settings and functional control of the electronic device for transmitting information, for example, input apparatuses such as touch screen, keypad, mouse, trackpad, touchpad, indicator stick, one or more mouse buttons, trackball, or joystick. The output apparatus 604 may include display devices, auxiliary lighting apparatuses (e.g., LEDs) and haptic feedback apparatuses (e.g., vibration motors), etc. The display devices may include, but are not limited to, liquid crystal displays (LCD), light emitting diode (LED) displays, and plasma displays. In some embodiments, the display devices may be touch screens.

Various implementations of the systems and technologies described above herein may be implemented in a digital electronic circuit system, an application specific integrated circuit (ASIC), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

These computing programs (also known as programs, software, software applications, or code) include machine instructions for programmable processors and can be implemented using advanced procedures and/or object-oriented programming languages, and/or assembly/machine languages. As used in this article, the terms "machine readable medium" and "computer readable medium" refer to any computer program product, device, and/or device (such as a disk, optical disk, memory, programmable logic device (PLD)) used to provide machine instructions and/or data to a programmable processor, including machine readable medium that receives machine instructions as machine readable signals. The term "machine readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other.

According to the technical solution adopted in the embodiments of the present disclosure, in response to receiving a data request sent by a client, content of the data request is parsed, to obtain identification information corresponding to the data request, where the identification information being grouping information comprised in the data request sent by the client; in response to the identification information being null, a first data set corresponding to the data request is acquired; all pieces of data in the first data set are grouped, based on data resources of the pieces of data and data time lengths of the pieces of data, to obtain a second data set corresponding to the first data set, where, the grouping indicating performing grouping on all the pieces of data in the first data set based on the data time lengths to obtain the grouping information the data request; and the second data set is sent to the client, which solves the following problems in the existing technology: in displaying a complex page, data transmission in an interface can only be splitted according to subjective assessment of a developer, and a splitting effect is not good; and if the time for acquiring time-consuming data later has been optimized to a reasonable value, it is inconvenient to recover the data transmission in the interface that has been split. By automatically splitting an one-time interface request into multiple times of interface requests, and requesting different data based on different identification information obtained after the splitting, the time-consuming data and non-time-consuming data may be acquired separately, the non-time-consuming data is processed first after it is returned, so that a serial process from data query to data transmission to page rendering becomes a partially serial, partially parallel process, which improves an efficiency of information transmission, and finally enables users to view page content as soon as possible, improving user experience.

It should be understood that the various forms of processes shown above may be used to reorder, add, or delete steps. For example, the steps disclosed in the present disclosure may be executed in parallel, sequentially, or in different orders, as long as the desired results of the technical solutions mentioned in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for transmitting information, the method comprising:

parsing, in response to receiving a data request sent by a client, content of the data request to obtain identification information corresponding to the data request, the identification information being grouping information comprised in the data request sent by a client;

acquiring, in response to the identification information being null, a first data set corresponding to the data request, the first data set comprising: data sources of pieces of data required by the data request and data time lengths of the pieces of data corresponding to the data sources, a data source being used to represent path information for acquiring corresponding data, and a data time length being used to represent a length of time consumed to acquire corresponding data from a data source of the corresponding data;

grouping all pieces of data in the first data set, based on the data resources of the pieces of data and the data time lengths of the pieces of data, to obtain a second data set corresponding to the first data set, the grouping indicating performing grouping on all the pieces of data in the first data set based on the data time lengths to obtain the grouping information the data request, the second data set comprising: pieces of the identification information and a data set corresponding to each piece of the identification information, and the data set comprising: the data sources of pieces of data corresponding to each piece of identification information, the data time lengths of the pieces of data corresponding to each piece of identification information and data contents of the pieces of data corresponding to each piece of identification information; and sending the second data set to the client.

2. The method according to claim 1, wherein grouping all pieces of data in the first data set, based on the data resources of the pieces of data and the data time lengths of the pieces of data, to obtain a second data set corresponding to the first data set, comprises:

re-arranging all the pieces of data in the first data set, based on the data resources of the pieces of data, to obtain the re-arranged first data set; and grouping the re-arranged first data set, based on a comparison result of a data resource of each piece of data with a time consumption threshold and a time consumption gradient, to obtain the second data set corresponding to the re-arranged first data set, wherein the grouping is used to represent performing grouping on pieces of data in which each piece of data has a data time length greater than the time consumption threshold according to the time consumption gradient, and the time consumption threshold and the time consumption gradient are set based on an importance of each piece of data in the first data set.

3. The method according to claim 1, wherein after grouping all pieces of data in the first data set, based on the data resources of the pieces of data and the data time lengths of the pieces of data, to obtain a second data set corresponding to the first data set, the method further comprises:

adjusting data time lengths of pieces of data in the second data set based on an adjustment method, to obtain the adjusted second data set, wherein the adjustment method is used to represent a weighting operation performed on the data time lengths of the pieces of data in the second data set based on a preset time period.

4. The method according to claim 1, wherein before grouping all pieces of data in the first data set, based on the data resources of the pieces of data and the data time lengths of the pieces of data, to obtain a second data set corresponding to the first data set, the method further comprises:

correcting the data time lengths of the pieces of data in the first data set, based on a determination result of an importance of each piece of data in the first data set, wherein the correction is performed to reduce a time length consumed by a piece of data of a high importance.

5. The method according to claim 1, wherein the method further comprises:

acquiring, in response to the identification information not being null, a first data set corresponding to the data request and sending the first data set to the client.

6. A method for transmitting information, the method comprising:

acquiring, in response to receiving a query request from a user, query information corresponding to the query request;

determining, based on the query information and a first list, whether the query is a first-time query, wherein the first list is used to store data information corresponding to the query request;

sending, in response to the query being the first-time query, a data request corresponding to the query information to the server; and updating, in response to receiving a second data set sent by the server, the first list based on the identification information in the second data set, wherein the second data set is determined by grouping, by the server, all pieces of data in a first data set, based on data resources of pieces of data and data time lengths of the pieces of data included in the first data set, the grouping indicating performing grouping on all the pieces of data in the first data set based on the data time lengths to obtain the grouping information the data request, the second data set comprising: pieces of the identification information and a data set corresponding to each piece of the identification information, and the data set comprising: the data sources of pieces of data corresponding to each piece of identification information, the data time lengths of the pieces of data corresponding to each piece of identification information and data contents of the pieces of data corresponding to each piece of identification information.

7. The method according to claim 6, wherein the method further comprises:

acquiring, in response to the query not being a first-time query, a set of identification information corresponding to the query information in the first list; and sending the data request corresponding to the identification information to the server in sequence, based on each piece of identification information in the set of identification information.

8. The method according to claim 6, wherein the method further comprises:

converting, in response to receiving a first data set sent by the server, the first data set to obtain converted data information, wherein the converting is used to represent rendering pieces of data in the first data set based on a page rendering method and/or stacking the pieces of data in the first data set based on a data time length; and displaying a page corresponding to the converted data information to the user.

9. An apparatus for transmitting information, the apparatus comprising:

at least one processor; and a memory storing instructions, wherein the instructions when executed by the at least one processor, cause the at least one processor to perform operations, the operations comprising:

parsing, in response to receiving a data request sent by a client, content of the data request to obtain identification information corresponding to the data request, the identification information being grouping information comprised in the data request sent by a client;

acquiring, in response to the identification information being null, a first data set corresponding to the data request, the first data set comprising: data sources of pieces of data required by the data request and data time lengths of the pieces of data corresponding to the data sources, a data source being used to represent path information for acquiring corresponding data, and a data time length being used to represent a length of time consumed to acquire corresponding data from a data source of the corresponding data;

grouping all pieces of data in the first data set, based on the data resources of the pieces of data and the data time lengths of the pieces of data, to obtain a second data set corresponding to the first data set, the grouping indicating performing grouping on all the pieces of data in the first data set based on the data time lengths to obtain the grouping information the data request, the second data set comprising: pieces of the identification information and a data set corresponding to each piece of the identification information, and the data set comprising: the data sources of pieces of data corresponding to each piece of identification information, the data time lengths of the pieces of data corresponding to each piece of identification information and data contents of the pieces of data corresponding to each piece of identification information; and sending the second data set to the client.

10. The apparatus according to claim 9, wherein grouping all pieces of data in the first data set, based on the data resources of the pieces of data and the data time lengths of the pieces of data, to obtain a second data set corresponding to the first data set comprises:

re-arranging all the pieces of data in the first data set, based on the data resources of the pieces of data, to obtain the re-arranged first data set; and grouping the re-arranged first data set, based on a comparison result of a data resource of each piece of data with a time consumption threshold and a time consumption gradient, to obtain the second data set corresponding to the re-arranged first data set, wherein the grouping is used to represent performing grouping on pieces of data in which each piece of data has a data time length greater than the time consumption threshold according to the time consumption gradient, and the time consumption threshold and the time consumption gradient are set based on an importance of each piece of data in the first data set.

11. The apparatus according to claim 9, wherein the operations further comprise:
adjusting data time lengths of pieces of data in the second data set based on an adjustment method, to obtain the adjusted second data set, wherein the adjustment method is used to represent a weighting operation performed on the data time lengths of the pieces of data in the second data set based on a preset time period.

12. The apparatus according to claim 9, wherein the operations further comprise:
correcting the data time lengths of the pieces of data in the first data set, based on a determination result of an importance of each piece of data in the first data set, wherein the correction is performed to reduce a time length consumed by a piece of data of a high importance.

13. The apparatus according to claim 9, wherein operations further comprise: acquiring, in response to the identification information not being null, a first data set corresponding to the data request; and sending the first data set to the client.

14. An apparatus for transmitting information, the apparatus comprising:
at least one processor; and
a memory storing instructions, wherein the instructions when executed by the at least one processor, cause the at least one processor to perform the method for transmitting information according to claim 6.

15. The apparatus according to claim 14, wherein the method further comprises:
acquiring, in response to the query not being a first-time query, a set of identification information corresponding to the query information in the first list; and sending the data request corresponding to the identification information to the server in sequence, based on each piece of identification information in the set of identification information.

16. The apparatus according to claim 14, wherein the method further comprises:
converting, in response to receiving a first data set sent by the server, the first data set to obtain converted data information, wherein the converting is used to represent rendering pieces of data in the first data set based on a page rendering method and/or stacking the pieces of data in the first data set based on a data time length; and displaying a page corresponding to the converted data information to the user.

17. A non-transitory computer readable storage medium storing computer instructions, wherein, the computer instructions are used to cause the computer to perform the method according to claim 1.

18. A non-transitory computer readable storage medium storing computer instructions, wherein, the computer instructions are used to cause the computer to perform the method according to claim 6.

* * * * *